United States Patent [19]

Haraikawa

[11] 4,162,720
[45] Jul. 31, 1979

[54] MECHANICAL DISC BRAKE

[75] Inventor: Tetsuo Haraikawa, Funabashi, Japan

[73] Assignee: Tokico Ltd., Kanagawa, Japan

[21] Appl. No.: 850,485

[22] Filed: Nov. 10, 1977

[30] Foreign Application Priority Data

Nov. 20, 1976 [JP] Japan .................................. 51-139921

[51] Int. Cl.² ............................................. F16D 65/56
[52] U.S. Cl. ................................... 188/71.9; 188/72.7
[58] Field of Search ................. 188/71.9, 72.7, 72.8, 188/73.3, 196 BA

[56] References Cited

U.S. PATENT DOCUMENTS

| | | | |
|---|---|---|---|
| 2,142,757 | 1/1939 | Nardone | 188/72.8 |
| 3,321,049 | 5/1967 | Swift | 188/71.9 |
| 3,392,806 | 7/1968 | Knapp | 188/196 BA |
| 3,465,852 | 9/1969 | Belart | 188/196 BA |
| 3,467,228 | 9/1969 | Knights | 188/196 BA |
| 3,920,102 | 11/1975 | Ito | 188/196 BA |
| 3,976,169 | 8/1976 | Ogawa | 188/73.3 |
| 3,997,032 | 12/1976 | Kondo | 188/73.3 |
| 4,084,664 | 4/1978 | Haraikawa | 188/71.9 |

FOREIGN PATENT DOCUMENTS 1144306 3/1969 United Kingdom ................... 188/72.7

*Primary Examiner*—Edward R. Kazenske
*Attorney, Agent, or Firm*—Wenderoth, Lind & Ponack

[57] ABSTRACT

A mechanical disc brake includes a floating caliper having a pair of legs which are disposed on the opposite sides of a disc and one of which has an axial throughhole and the other of which has a friction pad facing one side of the disc. A support is secured to a vehicle and has a friction pad facing the other side of the disc. A bolt extends through the legs, a ramp is secured to the other leg against rotation, a rotational input receiving lever is secured to the one leg, a linear output generation member is secured to the lever for movement therewith, balls are disposed between the ramp and linear output generation members, a pawl member is secured to the lever for movement therewith and has pawls, a nut has ratchet teeth for engaging the pawls. A push rod applies the friction pad on the support against the other side of the disc, a spring has one end abutting against the other leg, and a sleeve has one end connected to the liner output generation member and the other end abutting against the other end of the spring.

4 Claims, 6 Drawing Figures

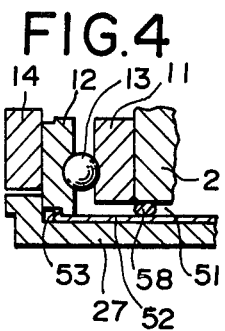
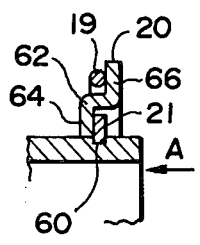
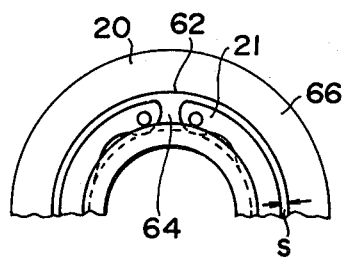

MECHANICAL DISC BRAKE

BACKGROUND OF THE INVENTION

This invention relates to a mechanical disc brake and more particularly, to a mechanical disc brake which comprises a self-clearance adjusting mechanism having force conversion means adapted to convert a rotational input into a linear output.

A mechanical disc brake of the above type is disclosed in Japanese patent application No. 17,797, for example. However, in the above type disc brake, a lever return spring abuts at one end against one leg of the caliper and at the other end directly against the outer end of a nut through a stop ring, and the inner end of the nut engages a linear output generation member. Therefore, rotational force imparted to a lever is required to be greater than drag on rotation (Tn) generated between the nut and linear output generation member and between the return spring and stop ring, respectively. Furthermore, when the disc brake is released, drag on rotation (Tr) offered by the friction ring required to restrain the rotation of the nut should have a value greater than the value of Tn as a matter of course. On the other hand, when the brake clearance is to be adjusted, although the ratchet pawls of the leaf spring rotate the nut, the rotational force of these pawls is required to be sufficient to overcome the sum of the drag on rotation by the return spring and the drag on rotation by the friction ring, and as a result a grave problem arises as to how the enhance the durability of the pawls.

SUMMARY OF THE INVENTION

Therefore, the objects of the present invention are to eliminate the disadvantages inherent in the prior art mechanical disc brakes, to obtain a desired braking action with a low rotational input and to enhance the durability of the pawls of the leaf spring. To attain these objects, according to the present invention, a sleeve having a nut received therein is provided, and the sleeve draws the linear output generation member towards the caliper to thereby reduce the axial load acting on the nut.

The above and other objects and attendant advantages of the present invention will be more readily apparent to those skilled in the art from a reading of the following detailed description in conjunction with the accompanying drawings which show preferred embodiments of the invention for illustration purposes only, but not for limiting the scope of the same in any way.

BRIEF DESCRIPTION OF THE DRAWINGS

FIG. 4 is a fragmentary vertical sectional view of a modified embodiment of a sub-assembly mounting arrangement in the mechanical disc brake according to the present invention employing a resilient member;

FIG. 5 is a fragmentary sectional view showing a modified spring abutment means of the invention; and FIG. 6 is a fragmentary plane view as seen in the direction of arrow A in FIG. 5.

DETAILED DESCRIPTION OF PREFERRED EMBODIMENTS OF THE INVENTION

Figure 1:
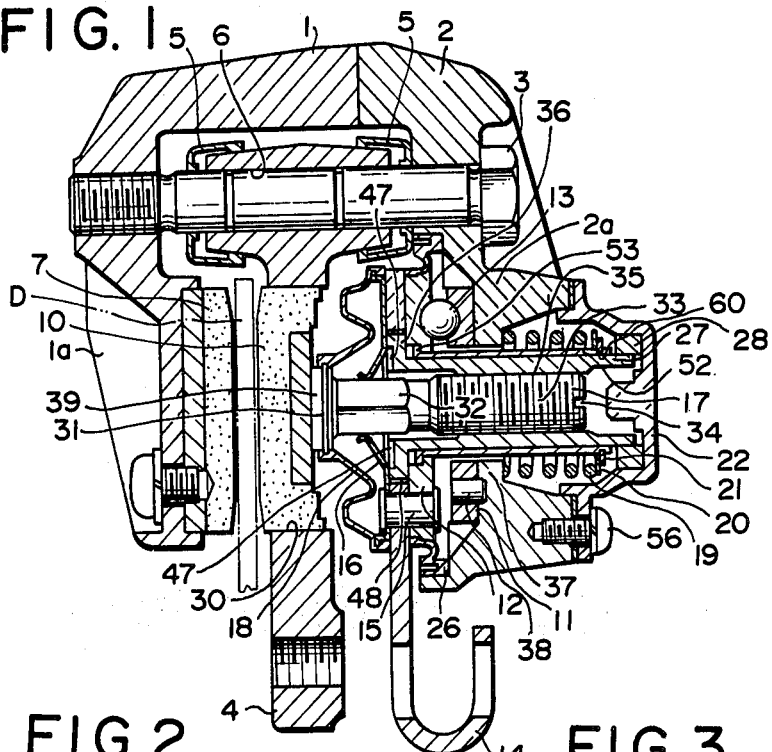
FIG. 1 is a vertical sectional view of one preferred embodiment of a mechanical disc brake according to the present invention.
Figure 2:
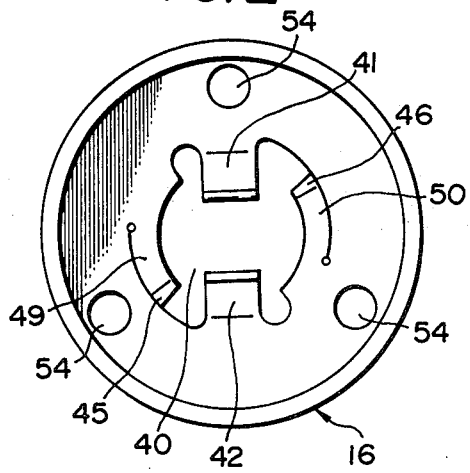
FIG. 2 is a plan view on an enlarged scale of the pawl member in the mechanical disc brake.
Figure 3:
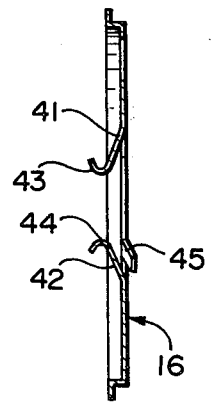
FIG. 3 is a cross-sectional view of the pawl member as shown in FIG. 2.

The present invention will be now described referring to the accompanying drawings and more particularly, to FIGS. 1 through 3 thereof which show the first embodiment of a mechanical disc brake constructed in accordance with the present invention. The disc brake generally comprises first and second housing portions 1 and 2 connected together by a bolt 3 which slidably extends through the housing portions and an eccentric guide hole 6 in a bracket 4 disposed between and spaced from the housing portions. A pair of dust boots 5 are disposed about the bolt 3 on the opposite sides of the guide hole 6 to prevent invasion of dust and foreign matter into the guide hole. Reference character D denotes a disc, and a pair of friction pads 7 and 10 are disposed on the opposite sides of the disc for frictional engagement with the disc to brake the disc. One of the friction pads 7 is suitably secured to the leg 1a of the housing portion 1, whereas the other pad 10 is fitted in a center opening 30 in the bracket 4. The outer side of the friction pad 10 is adapted to be engaged by the enlarged diameter extreme inner end 39 of a push rod 17 which is mounted in the leg 2a of the housing portion 2 in a manner as will be described hereinafter, whereby any uneven wear of the pad 10 which may otherwise occur as the pad is applied against the rotating disc D in application of the disc brake can be prevented.

The leg 2a of the housing portion 2 has a reduced diameter portion or shoulder 37 between the opposite ends thereof to define an axial opening 51 through which the push rod 17 extends, and the push rod has a largest diameter stepped portion 31 just rearwardly of the extreme inner end 39, a reduced diameter polygonal rotation restraining portion 32 in a form such as a square or hexagonal cross-section and an externally threaded adjusting portion 33 having the same diameter as the portion 32 and connected to the latter with a smallest diameter portion interposed therebetween. A slit 34 is provided at the outer end face of the push rod 17 extending diametrically across the end face, and an internally threaded nut member 27 is threadably received on the externally threaded push rod portion 33.

The nut member 27 interposed between the shoulder 37 of the leg 2a of the housing portion 2 and the push rod 17 and extending on the opposite sides of the shoulder has an enlarged portion or flange 36 at the inner end, and the flange is formed on the front or inner face thereof with ratchet teeth 47. A rotational input receiving brake lever 14 is disposed about the flange 36 and has a center through-hole 48 the diameter of which is slightly greater than the outer diameter of the flange 36 to loosely receive the flange therein. The brake lever 14 is connected to a cable or the like (not shown) to receive a braking force as its rotational input which is then transmitted from the lever to the disc brake.

A sleeve member 52 extends through the center opening 51 in the housing portion leg 2a in surrounding relationship to the nut member 27 and has a stop ring 21 fitted on the rear end portion (the right-hand end as seen in FIG. 1) and an annular plate 20 supported at the inner face of the stop ring. The sleeve member 52 is formed at the inner end with an outwardly extending flange 53. A compression spring 19 is disposed about the sleeve member 52 and abuts at the opposite ends against the shoulder 37 and annular plate 20, respectively to normally urge the sleeve member 52 rearwardly or outwardly. An annular linear output generation member 12 engages about the flange 53 of the sleeve member 52 and is normally urged rearwardly or rightwards as seen in FIG. 1 under the force of the spring 19. The rear or outer end of the nut member 27 frictionally engages in a friction ring 28 received within a cover 22 secured to the leg 2a of the housing portion 2 by means of set screws 56 (only one set screw 56 is shown in FIG. 1). The friction ring 28 is preferably formed of rubber and provides drag on the rotation of the nut member 27.

The outer face of the flange 36 at the inner end of the nut member 27 and the outer face of the lever 14 lie in the same vertical plane so that the radially and outwardly extending inner face of the linear output generation member 12 supports both the flange 36 and lever 14. Although not shown, the outer face of the member 12 is desirably formed with three inclined grooves in a manner known in the art. A corresponding number of similar grooves (not shown) is provided in a ramp member 11 which is secured to the shoulder 37 of the leg 2a of the housing portion 2 by means of fasteners 38 (only one fastener 38 is shown in FIG. 1). A ball 13 is received in each pair of the aligned pairs of grooves in the opposite faces of the output generation member 12 and ramp member 11.

An annular pawl member 16 in the form of a leaf spring is disposed about the push rod 17 with the peripheral portion of the pawl member in contact with the inner face of the lever 14. As shown in FIG. 1, the pawl member 16 is integrally connected to the lever 14 and linear output generation member 12 by means of a plurality of rivets 15 provided in an equally angularly spaced relationship (three rivets, for example).

As is more clearly shown in FIGS. 2 and 3, which show the pawl member on an enlarged scale, the annular pawl member 16 has a substantially H-shaped cut or opening 40 in the center with the upper and lower center engaging pieces 41 and 42 defining a portion of the cut being bent forwardly or inwardly at an equal angle with respect to the rest of the pawl member. The free ends 43 and 44 of the engaging pieces 41 and 42 are bent forwardly and inwardly in the opposite directions and contact and embrace diametrically opposite flat faces of the preferably regular polygonal rotation restraining portion 32 of the push rod 17 so as to restrain the push rod 17 from rotating. The pawl member 16 also includes three holes 54 positioned at an equal radial distance from the center of the pawl member 16 to receive the above-mentioned rivets 15 therein. The outer periphery of the pawl member 16 is first bent at right angles to and then in parallel to the main portion of the pawl member to form a stepped outer periphery, whereat the outer periphery of a dust boot 18 firmly engages and is held. The inner periphery of the dust boot 18 engages and is held on the largest diameter stepped portion 31 of the push rod 17, whereby the dust boot 18 perfectly shields the pawl member 16 from the atmosphere so as to prevent dust and foreign matter from access to the pawl member 16.

As is more clearly shown in FIGS. 2 and 3, the left and right-hand sides of the substantially H-shaped cut 40 are defined by opposite coaxial sectors 49 and 50 the free ends of which are bent in the direction opposite from the bending direction of the engaging pieces 41 and 42 so as to form ratchet pawls 45 and 46. The pawls 45 and 46 are so positioned that when the pawl member 16 is secured to the lever 14 and linear output generation member 12 by means of the rivets 15, the pawls 45 and 46 selectively engage the ratchet teeth 47 on the flange 36 at the inner end of the nut member 27. When the pawl member 16 moves in one direction with respect to the nut member 27, the pawls 45 and selectively engage the opposite ratchet teeth 47, whereas when the pawl member 16 moves in the opposite direction, the pawls 45 and 46 resiliently disengage from the ratchet teeth.

An annular dust cover 26 is disposed between the outer periphery of the linear output generation member 12 and the inner surface of the housing portion 2 in the conventional manner so as to prevent dust and other foreign matters from the disc and the like from access to the ramp member 11, linear output generation member 12 and steel balls 13.

The present invention also contemplates that the bent engaging pieces 43 and 44 of the pawl member 16 may be eliminated and, instead, the cover 22 will be provided with an inwardly extending projection of square cross-section which is adapted to engage in a similar cross-section hole in the adjacent or outer end of the push rod 17 to prevent rotation of the push rod.

In the mechanical disc brake illustrated and described hereinabove, it is assumed that the disc brake is operated when the friction pads 7 and 10 have worn to a predetermined degree or prior to the adjustment of the pads. Then, when the lever 14 is rotated in one direction from its initial position by pulling the lever by means of the operation cable or the like means, rotational input to the lever is converted into a linear output by the ramp member 11 and steel balls 13 which output in turn causes the push rod 17 to urge the friction pad 10 against the disc D to generate a reaction force which in turn urges the opposite friction pad 7 against the disc D. In other words, the rotation of the lever 14 causes the linear output generation member 12 and pawl member 16 to follow the rotation of the lever 14, and the engaging pieces 41 and 42 of the pawl member 16 rotate the push rod 17 in the same direction as the lever 14 through the rotation restraining portion 32 of the push rod. At this time, since the nut member 27 is restrained from rotating by the friction ring 28, the nut member 27 remains stationary and thus, the ratchet teeth 47 on the inner end face of the nut member 27 remain stationary and the pawls 45 and 46 of the pawl member 16 move beyond the ratchet teeth 47 whereupon the linear output generation member 12 displaces forwardly (leftwards as seen in FIG. 1) under the force which is generated between the steel balls 13 and ramp member 11 against the force of the compression spring 19. As a result, the flange 36 of the nut member 27 receives a forward thrust and bodily slides the nut member 27 forwardly within the friction ring 28. The forward movement of the nut member 27 moves the push rod 17 forwardly or leftwards through the threaded engagement between the threaded portion 35 of the nut member 27 and the adjusting threaded portion 33 of the push rod 17 to urge the friction pad 10 against the adjacent side of the disc D and at the same time, a reaction force is generated by the forward movement of the linear output generation member 12 to urge the other friction pad 7 against the other side of the disc D through the ramp member 11, housing portion 2, bolts 3 and housing portion 1 whereby the disc D is pinched on the opposite sides by the friction pads 10 and 7 and subjected to braking thereby.

Thereafter, when the lever 14 is released, the lever is allowed to rapidly return to its initial position under the force of the compressed spring 19 and at the same time, the pawl member 16 is also allowed to return to its initial position. The movement of the pawl member 16 to the initial position moves the nut member 27 in the same direction as the pawl member through the engagement between the pawls 45 and 46 of the pawl member 16 and the ratchet teeth 47 on the nut member 27 against the force of the friction ring 28. In the embodiment of the invention illustrated and described hereinabove, since the spring 19 normally urges the linear output generation member 12 rearwardly or outwardly through the sleeve member 52, the pawls 45 and 46 of the pawl member 16 can easily rotate the nut member 27 free of any drag on rotation which would be generated between the lever 14 and nut member 27 whereby relative rotational movement may tend to occur between the lever 14 and nut member 27. However, since the lever 14 and push rod 17 are connected together by the engaging pieces 43 and 44 on the pawl member 16, the lever 14 and nut member 27 are prevented from relative movement with respect to each other. Thus, the nut member 27 would have rotated by a certain angular distance with respect to the push rod 17 and accordingly, the rod 17 is fed towards the friction pad 10 by the distance corresponding to the angular movement of the nut member 27 by means of the engagement between the threads 33 and 35 to thereby reduce the clearance between the pad 10 and disc D to compensate for wear on the pad 10.

When the clearance has become sufficiently small or when the amount of wear on the friction pads 10 and 7 have been compensated for, even when the lever 14 rotates, the pawls 45 and 46 of the pawl member 16 which moves as the lever rotates will not move beyond the ratchet teeth 47 of the nut member 27, and even when the lever 14 is allowed to rotate to its initial position, the pawls 45 and 46 will not rotate the nut member 27, whereby no adjustment is made.

When the friction pads 7 and 10 squeeze the disc D therebetween as the push rod 17 moves leftwards or inwardly in response to the rotation of the lever 14 in the application of the disc brake, the subsequent rotation of the lever 14 generates a substantial axial thrust in the push rod 17. Therefore, the nut member 27 is urged at the outer face of the flange 36 against the linear output generation member 12 with a high reaction force generated as the result of such thrust force and rotates together with the lever 14 against the restraining resistance offered by the friction ring 28. Accordingly, in such a case, even when the lever 14 is rotated, the pawls 45 and 46 will not move beyond the ratchet teeth 47.

As is clear from the foregoing description of the embodiment illustrated and described hereinabove, the adjusting action provided by the ratchet teeth 47 and pawls 45 and 46 occurs before the pad or pads are urged against the disc only when the clearance between the disc and friction pads has exceeded a predetermined value.

Therefore, any deformation of the housing and/or pads themselves has nothing to do with such adjusting action and thus, there is no possibility of excess adjustment due to any deformation of the parts themselves.

When the pad or pads are desired to be replaced by a new one or ones, such replacement can easily be performed by removing the cover 22 from the housing portion 2, inserting a screw drive or the like into the slit 34 in the push rod 17 and turning the rod in the direction away from the pad 10.

With the above-mentioned construction and arrangement of the parts of the mechanical disc brake, the disc brake has the self-adjusting function by which the pawl member rotates the nut member so as to feed the push rod which is in threaded engagement with the nut member, whereby the clearance between the disc and pad or pads can be automatically adjusted within a predetermined range. The disc brake further has a rotation prevention function with respect to the push rod. Thus, the disc brake can be produced having a small or compact size requiring no unnecessary space, and since the linear output generation member 12 is subjected to the force which acts to disengage the member away from the enlarged flange 36 of the nut member 27 by the aid of the action of the sleeve member 52, no axial load is applied to the nut member 27 and a desired adjustment is obtained merely by the arrangement in which the pawls 45 and 46 of the pawl member 16 overcome the drag on rotation offered by the friction ring 28. In this way, a problem relating to the durability of the pawls can easily be solved. The present invention is not limited to the conventional arrangement in which drag on rotation occurs between the linear output generation member 12 and nut member 27 in a value smaller than that which represents the strength of the pawls 45 and 46 minus the drag on rotation offered by the friction ring 28. The drag on rotation can be selected in accordance with a demand on the vehicle size regardless of the durability of the pawls.

FIG. 4 shows an alternative arrangement which simplifies the assembly of the mechanical disc brake as shown in FIG. 1.

In the assembly of the mechanical disc brake as shown in FIG. 1, it has been conventionally followed that the lever, the force conversion mechanism adapted to convert a rotational input into a linear output, the pads adapted to applied against the disc, the push rod, the nut member and the sleeve member are preliminarily assembled into a sub-assembly and the thus obtained sub-assembly is then mounted in the caliper in a floating condition within the through-holes in the legs while being held in one hand of the worker so that the components of the sub-assembly will not separate from each other. However, when the sub-assembly is mounted in the caliper, since the sub-assembly is floatingly held and the space for the sub-assembling operation is limited, the components which constitute the force conversion mechanism tend to frequently fall down and thus, the mounting of the sub-assembly has to be conducted with extreme care. Furthermore, even after the sub-assembly has been mounted in the caliper, the movement of the components of the sub-assembly except for the ramp member is not directly restrained by the caliper, but the components are merely suspended within the caliper in a floating condition. Thus, the entire mechanism tends to deflect and to adversely affect the operation of the disc brake.

Referring to FIG. 4, according to the present invention, the above-mentioned disadvantages can be eliminated by preliminarily placing a friction ring 58 about the sleeve member 52 and then inserting the above-mentioned sub-assembly into the opening 51 defined by the intermediate reduced diameter portion or shoulder 37 of the leg 2a of the housing portion 2 so as to hold the ring 58 in the opening 51.

FIGS. 5 and 6 disclose modified support members for supporting one end of the compression spring 19 of the invention.

In the prior art floating caliper-type mechanical disc brake referred to hereinabove, the annular spring abutment plate 20 against which the outer end of the spring 19 abuts is formed of a flat disc which is supported on the outer face thereof by the prior art stop ring 21 fitted within a notch 60 formed in the sleeve member 52 (in the embodiments shown in FIGS. 1 through 4). However, in many cases, since such a notch 60 is shallow in depth, the stop ring 21 frequently comes off the notch 60 when subjected to a thrust load during the application of the brake or vibration from the moving vehicle with which the disc brake is employed. When such a difficulty occurs, positive separation of the friction pad or pads from the disc and positive return of the rotation input receiving lever to its initial position after the application of the disc brake are not ensured.

In order to prevent the stop ring from coming off the notch 60, the annular plate 20 is provided with a bent portion 62 which engages the outer periphery of the stop ring 21 to hold the ring against coming off the notch 60. In other words, the annular plate 20 is of a dish-shaped configuration having a recessed center.

As is more clearly shown in FIG. 5, the annular plate 20 comprises a flat annular center portion 64 projecting forwardly or inwardly, a flat annular rearwardly or outwardly projecting peripheral portion 66 lying in a plane parallel to that in which the center portion lies and an intermediate portion 62 extending between and connecting the center and peripheral portions 64 and 66 substantially at right angles to the portions. The outer face of center portion 64 engages the inner face of the stop ring 21 to hold the stop ring in position whereas the peripheral portion 66 presents its spring abutting face to the outer end of the spring 19. The intermediate portion 62 connecting the portions 64 and 66 has an inner diameter somewhat greater than the outer diameter of the stop ring 21. More particularly, as shown in FIG. 6, the clearance S between the outer periphery of the stop ring 21 and the inner surface of the intermediate portion 62 is selected to be smaller than the depth of the notch 60 whereby the stop ring 21 is positively prevented from coming off the notch 60 because the stop ring 21 is not allowed to move radially and outwardly to the degree that the ring comes off the notch 60.

Thus, the present invention provides an economical, positively operative and safe mechanical disc brake which is adjustable, regardless of the durability of the pawls, ensures perfect and easy mounting of the sub-assembly in the disc brake housing, precludes adverse effects on the sub-assembly due to deflection of the sub-assembly in the application of the brake and holds the stop ring in position by merely bending the spring abutment plate without requiring any specific stop ring holding means.

While several embodiments of the invention have been shown and described in detail, it will be understood that the same are for illustration purposes only and not to be taken as a definition of the invention, reference being had for this purpose to the appended claims.

What is claimed is:

1. A mechanical disc brake comprising:

a rotary disc;
a caliper having first and second legs disposed on the opposite sides of said rotary disc;
said second leg having a through-hole extending in the axial direction of said disc;
said first leg having mounted thereon a first friction pad facing a first side of said disc;
a stationary support having mounted thereon a second friction pad facing a second side of said disc;
a bolt extending between said first and second legs and having an intermediate portion slidably received in said support;
a ramp member mounted against rotation on said second leg;
a rotational input receiving lever mounted for rotation;
a linear output generation member connected to said lever for movement in unison therewith;
balls received in aligned grooves formed in adjacent faces of said ramp member and said linear output generation member, such that rotation of said lever and said linear output generation member will cause linear movement of said lever and said linear output generation member away from said ramp member and toward said disc;
a leaf spring mounted for movement in unison with said lever, said leaf spring having ratchet pawls;
a nut including an integral flange having an outer periphery which is positioned between said linear output generation member and said leaf spring, such that said nut is moved linearly upon linear movement of said linear output generation member, said flange having an inner face formed with ratchet teeth for engaging said ratchet pawls;
a push rod extending through said nut in threaded engagement therewith for applying said second friction pad against said second side of said disc upon linear movement of said nut;
a spring having first and second ends, said first end of said spring abutting against said second leg; and
a sleeve rotatably surrounding said nut and having an open first end connected to said linear output generation member and an open second end abutting against said second end of said spring, such that said spring normally biases said linear output generation member towards said second leg.

2. A mechanical disc brake as claimed in claim 1, further comprising a resilient member interposed between said sleeve and said second leg of said caliper.

3. A mechanical disc brake as claimed in claim 1, further comprising spring abutting means including a C-shaped stop ring received in a notch in said sleeve, and an annular spring abutment plate including a center portion having an outer surface which engages the inner face of said stop ring, a peripheral portion having an inner surface which defines a spring abutting face which abuts said second end of said spring, and an intermediate portion connecting said center portion and said peripheral portion, said intermediate portion extending substantially parallel to the axis of said sleeve so as to overlie the outer periphery of said stop ring.

4. A mechanical disc brake as claimed in claim 3, wherein said intermediate portion and said outer periphery of said stop ring are spaced by a distance less than the depth of said notch.